April 14, 1964 — D. H. BROOKS, JR., ETAL — 3,128,539
WHEEL MANUFACTURE

Filed Jan. 16, 1961 — 2 Sheets-Sheet 1

INVENTORS
DEWEY H. BROOKS JR.
ORVILLE W. JACOBS

BY Edward A. Noé

THEIR ATTORNEY

April 14, 1964     D. H. BROOKS, JR., ETAL     3,128,539
WHEEL MANUFACTURE

Filed Jan. 16, 1961     2 Sheets-Sheet 2

INVENTORS
DEWEY H. BROOKS JR.
ORVILLE W. JACOBS

BY

THEIR ATTORNEY

United States Patent Office 3,128,539
Patented Apr. 14, 1964

3,128,539
WHEEL MANUFACTURE
Dewey H. Brooks, Jr., and Orville Wright Jacobs, Dayton, Ohio, assignors to The Sheffield Corporation, Dayton, Ohio, a corporation of Delaware
Filed Jan. 16, 1961, Ser. No. 82,748
4 Claims. (Cl. 29—159)

This invention relates to the manufacture of flanged wheels formed from cold deformable metal. More particularly, the invention is concerned with an improvement in the manufacture of wheels having a generally V-shaped rim formed integrally with the body or disk portion.

One object of the invention resides in the method of making a flanged wheel from cold deformable metal whereby a portion of the metal is folded over upon itself in making the rim portion and in which all of the operations are accomplished by compression forces applied to the blank in an axial direction.

Another object of the invention resides in the method of manufacturing a wheel having a relatively deep annularly grooved flange formed integrally with the disk portion, in which a sheet metal blank is first drawn into substantially cup-shape; then a camming force is applied axially to the flanged portion of the cup to bulge it outwardly, and a compression force is then applied to the bulged portion in an axial direction to fold a part of the rim over upon itself.

A further object of the invention resides in the method of making a flanged wheel of the character mentioned in which a cup-shaped member is first drawn from a flat sheet metal blank so that an offset is formed in the flange portion of the cup and this offset portion is then bulged outwardly by the application of an axial force which cams the offset portion outwardly to form a bulge and the bulged portion is then folded over upon itself, all of these operations being accomplished by pressures applied in an axial direction so that the manufacture may be accomplished in a press.

Figure 1:
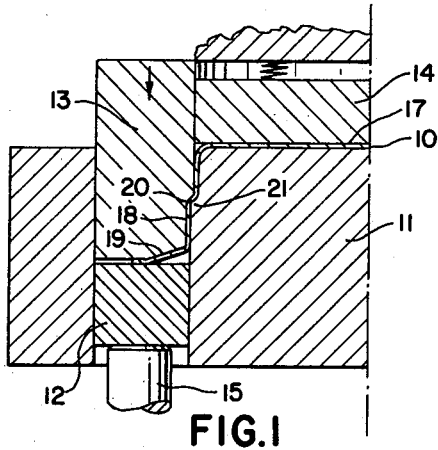
Figure 2:
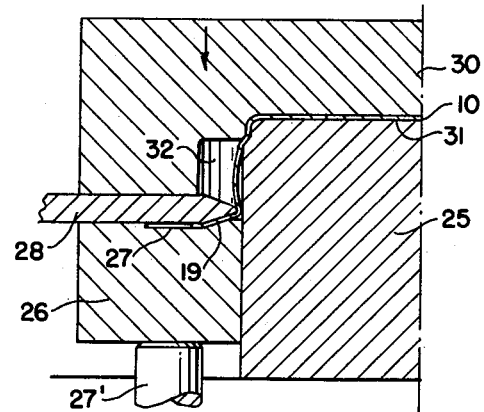
Figure 3:
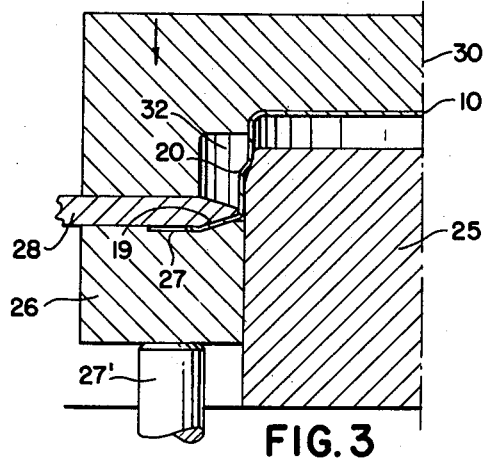
Figure 4:
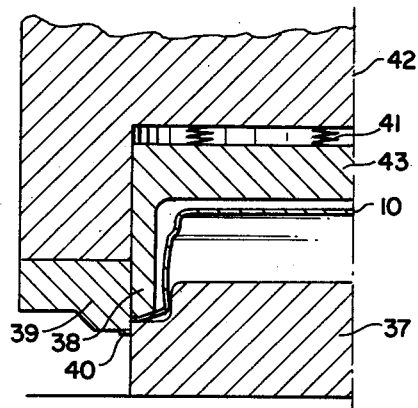
Figure 5:
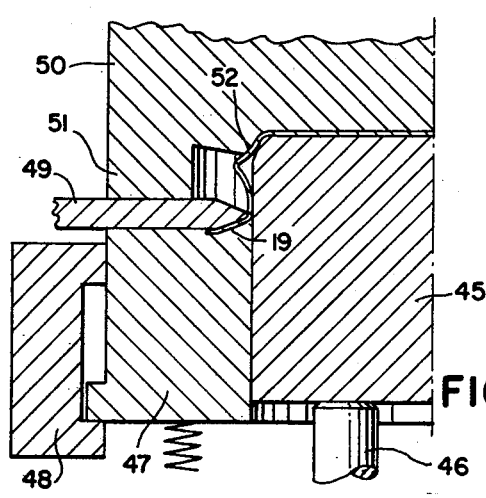
Figure 6:
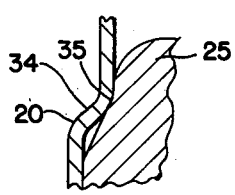
Figure 7:
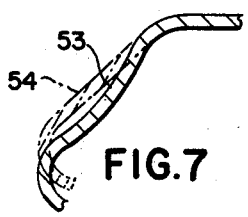
Figure 8:
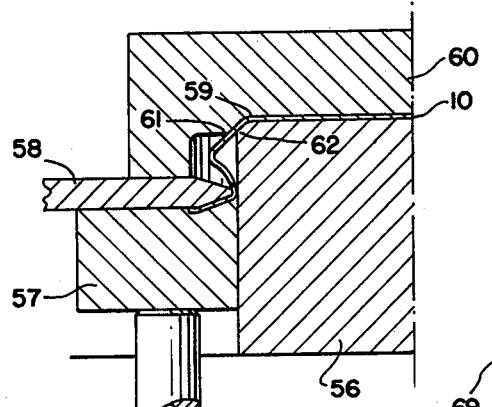
Figure 9:
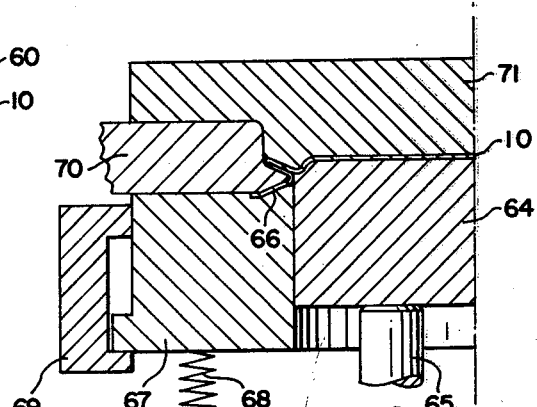
Figure 10:
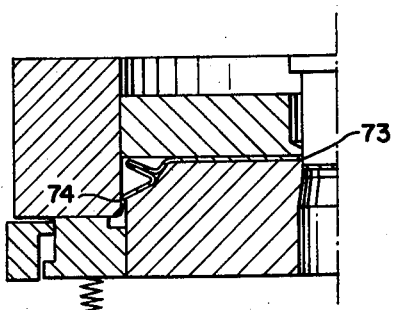
Figure 11:
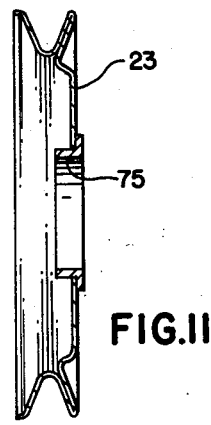

Other objects and advantages of the invention will be apparent from the following description, the appended claims, and the accompanying drawings, in which:

FIGURE 1 is a sectional view taken axially through a half of the partially formed blank and showing the forming dies at the end of the first drawing operation, FIGURE 2 is a corresponding view showing the second operation on the blank, FIGURE 3 is a corresponding view showing the second operation only partially accomplished, FIGURE 4 is the corresponding view showing the trimming of the partially formed blank, FIGURE 5 is a corresponding view showing a succeeding operation, FIGURE 6 is an enlarged sectional view at the beginning of the camming operation illustrated in FIGURE 3, FIGURE 7 is an enlarged view showing the change accomplished by the operation of FIGURE 8, FIGURE 8 is a sectional view showing the parts at the completion of the fifth operation, FIGURE 9 is a sectional view showing the sixth operation, FIGURE 10 is a corresponding sectional view showing the seventh operation, and FIGURE 11 is a central sectional view of the completed wheel.

Referring more particularly to the drawing in which the several steps of the method involved in the present invention are illustrated, 10 designates a sheet metal blank at the completion of a first drawing operation performed in a suitable drawing press in which the several forming dies are operably mounted. These dies include a punch 11, surrounding which is a blank holding ring 12 and a drawing ring 13, and above which is the central portion 14 of the upper die. The die portion 14 is preferably a stripper slide. The punch 11 and the other dies shown are relatively movable but in the particular form of die arrangement illustrated, the punch 11 is fixed. The blank holding ring 12 is supported by pins 15 on a pressure cushion, not shown, and the dies 13 and 14 are arranged on the upper slide of the press to be moved downwardly into the position shown and draw a flat disk of sheet metal into a substantially cup-shaped form, as illustrated. This cup-shaped form has a central disk portion 17, a generally cylindrical flanged portion 18 having a terminal outwardly flaring portion 19 with an offset 20 in the flanged portion about midway thereof. This offset portion is provided by offset or bulge 21 on the punch.

The next step in the process of forming an integral sheet metal wheel, such for example as a pulley wheel or the like, shown in its finished form at 23 in FIGURE 10, is to replace the partially formed blank in a different set of dies, as illustrated in FIGURE 2, in which, here again, the punch 25 is fixed in the bed of a press and is surrounded by a pressure pad 26 held on pins 27' operated by a suitable pressure cushion in the bed of the press. The pressure pad 26 has a recess 27 that receives the outwardly flanged portion 19 of the blank and this flanged portion is held firmly in place by radially movable blank holding die sections, one of which is shown at 28. There may be several of these operable inwardly into the position shown in FIGURE 2 by the press mechanism after the partially formed blank has been placed on the pressure pad 26 with the pressure pad and the die sections 28 in an elevated position about level with the top of the punch. The upper die 30 is mounted on the press slide or ram and is provided with a recess 31 shaped to fit to the top of the partially formed blanks, as produced by the die shown in FIGURE 1. However, there is a space 32 extending around the upper portion of the punch, as will be evident. The outer portion of the upper die 30 extends down to and cooperates with the pressure pad 26 and the die sections 28 and forces them downwardly against the action of the pressure pins so as to force the partially formed blank down over the punch into the position shown in FIGURE 2. Part way through the stroke of the dies illustrated in FIGURE 2, the parts assume the instantaneous positions as shown in FIGURE 3. In this position, it will be noted that a bulge near the upper end of the punch is just starting to engage the offset 20 in the blank.

The main body portion of the punch has a diameter which is substantially the same as the maximum diameter of the lower cylindrical portion of the partially formed blank. The upper end of the punch, however, is smaller in diameter and is illustrated on a larger scale in FIGURE 6. It will be noted from FIGURE 6 that there is an inclined camming surface 34 that connects the main body portion to the upper portion of the punch which is of smaller diameter, the length of this camming portion in the direction of the axis of the blank being about the same as the distance from the camming surface to the end of the punch so that before the blank is fully drawn down over the punch, the camming surface 34 pushes radially outwardly by a camming operation on the bend 35 in the blank and bulges the middle portions of the flange outwardly in a symmetrical manner all around the flange without disturbing the lower portion of the flange where it merges into the flaring terminal end of the blank. This camming operation is accomplished by the application of a force in an axial direction on the blank with the top of the blank and the flaring terminal portion of the blank both confined. This produces a symmetrical outward bulge on the blank and forms it into the shape shown in FIGURE 2, extending into the space 32 at the upper die which has previously been referred to. It will be noted that since the camming portion 34 on the punch is rather close to the upper end of the punch, the camming operation will progress axially along the blank as the blank is forced down over the punch, leaving the upper portion of the flange closely adjacent to the end of the punch bent outwardly.

Although the trimming may take place at a different stage in the process, this trimming operation will be described as the next succeeding operation and is illustrated in FIGURE 4 in which, here again, the inner die member 37 is fixed and serves in cooperation with the gripping slide 38 to hold an outer portion of the terminal flange during the descent of the trimming die 39 so that the trimmed portion 40 will be separated from the blank. The several dies illustrated, with the exception of the inner die 37, may be moved by the ram of the press, suitable springs being 41 interposed between the die portions 42 and 43 so that the blank will be gripped between die members 37 and 43 while being trimmed.

The partially formed blank is then compressed axially to overlap the bulged portion of the flange over upon itself, producing a reverse fold which finally takes the shape illustrated in FIGURE 9. However, it is preferred that this compression take place in two stages. The first of these stages is shown in FIGURE 5. Here the punch 45 may be supported by pressure pins 46 and is surrounded by a lower spring-pressed outer die 47, the vertical movements of which are limited by stop means 48. Carried by the lower die 47 are radially operable blank holding die sections 49, operable in time with the press movements so they may be moved inwardly into the position shown and cooperate with the outer die member 47 and hold the flanged portion 19 of the blank. When these die sections 49 move inwardly, they and the die member 47 are in an elevated position about in line with the upper end of the punch 45 which at that time is also elevated. The upper die 50 connected to the press slide has a downward extension 51 that forces the die portions 47 and 49 downwardly, but before they do so, with the central disk portion held between the upper die 50 and the upper end of the punch 45, an axial pressure is exerted on the flange causing it to bulge outwardly still further into the position shown in FIGURE 5. In this position, the shape of the partially formed blank is indicated at 53 in solid lines in FIGURE 7.

The next operation to be described, and as illustrated in FIGURE 8, produces a further outward flaring to move the bulge portion further outwardly to the position indicated in dotted lines in FIGURE 7. Thus, in FIGURE 8, the punch 56 is fixed, the lower pressure pad 57 is held by pressure pins and cushions, and the radially operable blank holding die portions 58 hold the outwardly flanged terminal portion of the blank during a further bulging of the flange portion produced by the from of the central recess 59 in the upper die 60 which here is shaped so that it flares outwardly as indicated at 61. The upper portion of the punch is also flared outwardly to a greater extent than is the punch 45 as indicated at 62.

The next succeeding step is to place the partially formed blank 10 on a punch 64 held by pressure cushion pin 65 so that the outwardly flaring flange is mounted in the recess 66 in the outer die 67 which is arranged on suitable springs 68. A stop 69 limits the travel of this outer die 67. Radially operable blank holding die sections 70 engage the upper side of the flange. Then the upper die 71 operated by the press slide descends and applies an axial force on the disk portion of the blank so as to overlap the bulged portion upon itself and force the overlapped portions tightly together coining them against the upper end of the punch 64 which is now shaped to the exact shape to be finally imparted to the central position of the wheel.

The final step in the operation may be a punching operation to cut out the central hub hole 73 and to simultaneously turn down the end 74 of the flange, as indicated in FIGURE 10. The hub itself 75 may then be connected as by welding to the central portion of the formed wheel.

As will be apparent, the several operations involved may all be performed in a press or press operations and in all of the forming operations the forces are applied in an axial direction. By arranging the bulge in the proper manner on the flange that is initially drawn and by camming the bulge outwardly and then following this with a squeezing or compression operation, the method may be carried out on a high volume production basis, especially if suitable transfer mechanism is provided to move the parts from one set of dies to the next set of dies and on through to completion. In accordance with the present method, the walls of the wheel will be of uniform strength and balanced with adequate strength at the parts where this is required.

While the method herein described and the form of apparatus referred to herein constitute preferred embodiments of the invention, it is to be understood that the invention is not limited to the precise method or form of apparatus and that changes may be made therein without departing from the scope of the invention which is defined in the appended claims.

What is claimed is:

1. The method of making a peripherally grooved sheet metal wheel comprising drawing a sheet metal blank to substantially cup-shape to provide a central disk portion with a generally cylindrical flanged portion having a terminal outwardly flaring portion with an offset in the flanged portion so that part of the flanged portion which is adjacent to the disk portion is of a smaller diameter than the part of the flanged portion which is adjacent the terminal outwardly flaring portion, then progressively camming the offset portion of the blank by relative axial sliding movement of the blank over a camming member to force the flange into an outwardly bulged shape while maintaining the diameter of the flange where it joins the outwardly flaring portion, then axially compressing the partially formed blank to overlap the bulged portion of the flange upon itself and thus form one side of the peripheral groove, the other side of which is provided by the outwardly flaring terminal portion of the blank.

2. The method of making a peripherally grooved sheet metal wheel comprising drawing a sheet metal blank to substantially cup-shape to provide a central disk portion with a generally cylindrical flanged portion having a terminal outwardly flaring portion with an offset in the flanged portion so that part of the flanged portion which is adjacent to the disk portion is of smaller diameter than the part of the flanged portion which is adjacent the terminal outwardly flaring portion, then progressively camming the offset portion of the blank by relative axial sliding movement of the blank over a camming member to force the flange into an outwardly bulged shape while confining the outwardly extending peripheral portion of the flange to maintain the diameter of the flange where it joins the outwardly flaring portion, then axially compressing the partially formed blank by successive pressing operations to overlap the bulged portion of the flange upon itself and thus form one side of the peripheral groove, the other side of which is provided by the outwardly flaring terminal portion of the blank.

3. The method of making a peripherally grooved sheet metal wheel comprising drawing a sheet metal blank to provide a central disk portion with a generally cylindrical flanged portion having a terminal outwardly flaring portion with an offset in the flanged portion spaced from the disk portion, so that part of the flanged portion which is adjacent to the disk portion is a smaller diameter than the part of the flanged portion which is adjacent to the terminal outwardly flaring portion, then camming the offset portion of the blank by relative axial sliding movement of the blank with respect to a camming member to force the flange positively into an outwardly bulged shape while confining the outwardly extended peripheral portion of the flange to maintain its form, then partially compressing the partially formed blank to partially overlap the bulged portion of the flange upon itself, and subsequently in a separate operation axially compressing the partially formed blank to forcefully overlap the bulged portion of the flange upon itself and thus form one side of the peripheral groove, the other side of which is provided by the outwardly flaring terminal portion of the blank.

4. The method of making a peripherally grooved sheet metal wheel as set forth in claim 3 but including the steps during the method of trimming the outside of the partially formed wheel and bending the circumferential edge of the outwardly flaring portion to extend substantially at right angles to the central portion of the wheel.

References Cited in the file of this patent
UNITED STATES PATENTS

| | | |
|---|---|---|
| 148,748 | Perkins | Mar. 17, 1874 |
| 238,007 | Spangler | Feb. 22, 1881 |
| 2,162,734 | Lyon | June 20, 1939 |
| 2,163,003 | Lyon | June 20, 1939 |
| 2,334,456 | Thorp | Nov. 16, 1943 |
| 2,493,053 | Zatyko | Jan. 3, 1950 |
| 2,660,970 | Koskinen | Dec. 1, 1953 |